Figure 3:
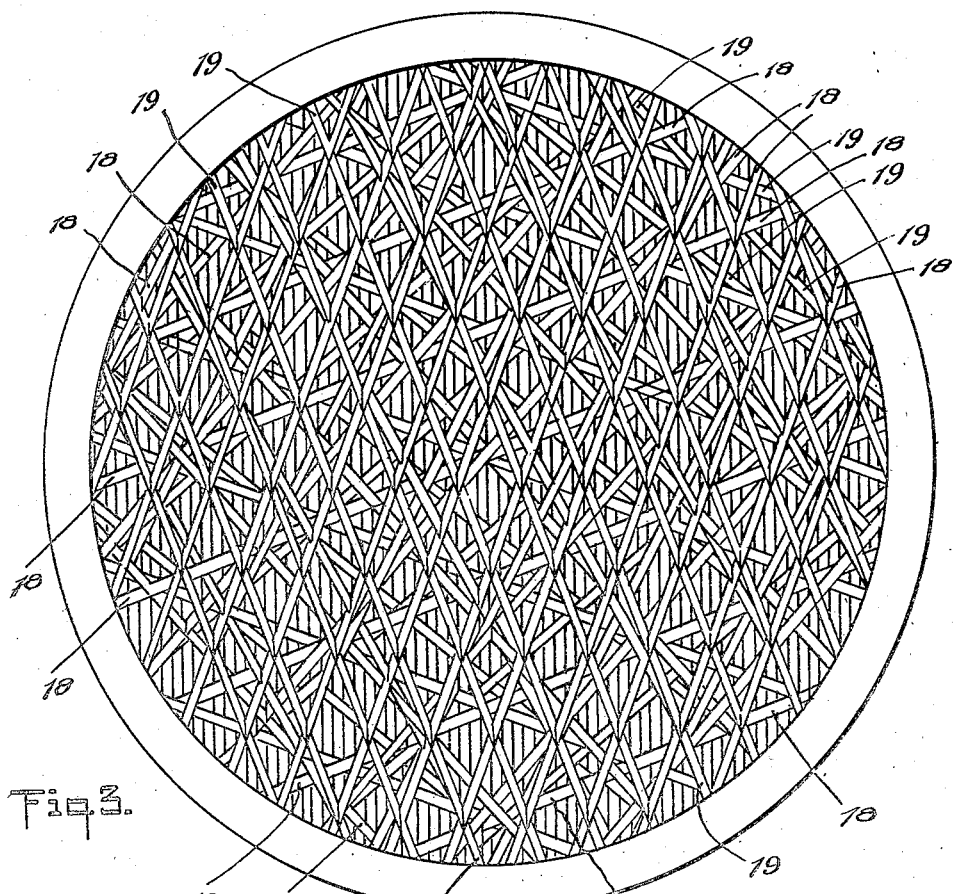

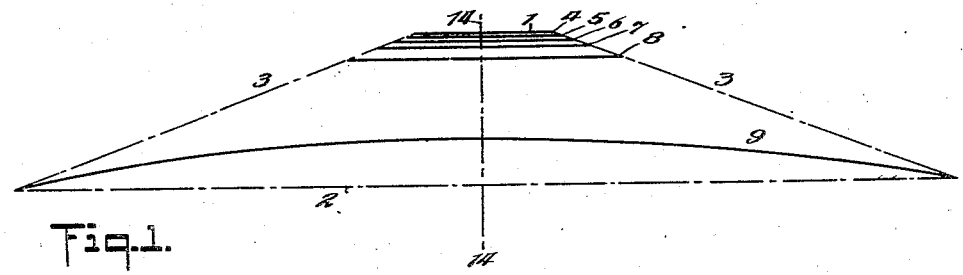
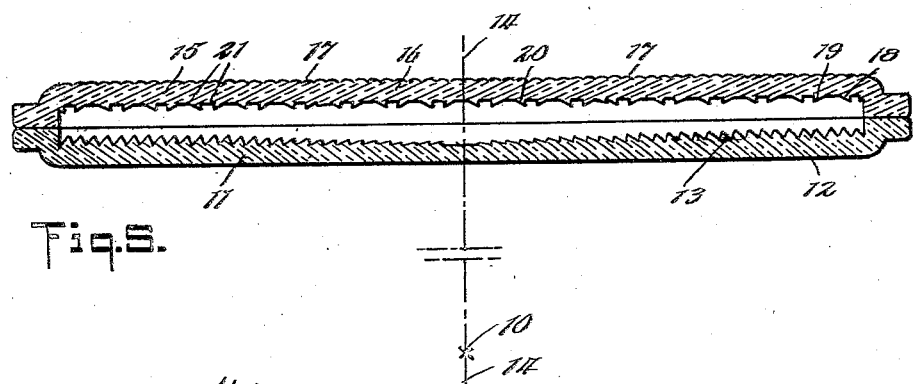
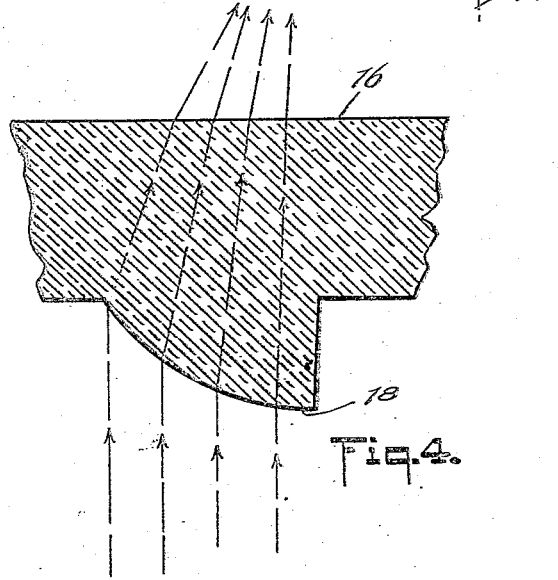

March 19, 1929.   T. W. ROLPH ET AL   1,705,943
LUMINAIR
Filed Dec. 24, 1925   2 Sheets-Sheet 2

INVENTORS
Thomas W. Rolph
and William A. Dorey
BY
their ATTORNEY

Patented Mar. 19, 1929.

1,705,943

UNITED STATES PATENT OFFICE.

THOMAS W. ROLPH AND WILLIAM A. DOREY, OF NEWARK, OHIO, ASSIGNORS TO HOLOPHANE COMPANY, INC., OF NEW YORK, N. Y., A CORPORATION OF NEW YORK.

LUMINAIR.

Application filed December 24, 1925. Serial No. 77,500.

The object of this invention is the construction of a prismatic device for use in cases where long substantially rectangular areas are to be lighted and where the light source is placed above and at one end of the area. If such a unit be correctly designed for this purpose and then be raised so that the plane of illumination is at eye level instead of the street or floor level, it will then serve very effectively as a signal to traffic.

If the unit be used as a signal, it is desirable that the light source image giving the signal shall be as large as possible at all angles in the field and it is therefore desirable that the whole face of the unit shall appear to be light giving from any angle in the field.

If such a unit is to be used for illumination purposes only, it is not absolutely essential that the light source images at any given angle in the field cover the whole face of the unit.

That part of the resultant beam which is to light the opposite end of the rectangle must be emitted at a high angle, will be projected the greatest distance, and will require the least lateral angular spread so as to fulfill the requirements. That part of the resultant beam lighting the adjacent end of the rectangle must be emitted at a low angle and it has the shortest distance to travel and requires the greatest lateral angular spread. At low angles in the field the light should be of very low intensity and wide spread compared to the light delivered at the highest angles in the field and for ideal service the intensity should systematically increase and the lateral spread decrease as the vertical angle in the field arises. The extreme variation in intensity required in the field increases greatly when the length of the rectangle is very great in proportion to the mounting height of the unit, and therefore provision for a rapid diminution of intensity at low angles becomes of great practical importance in extreme cases such as automobile headlighting and traffic control signals used in city streets. For any given set of conditions in such classes of service, the distribution requirements can very well be figured out on the basis of the field or light pattern to be produced by the unit on a vertical surface and if the unit is to be mounted in the center of the end of the rectangle, this light pattern on a vertical surface will be an isosceles trapezoid of wide angle. The intensity will drop off rapidly in downward directions and will be uniform laterally along the intercept of any cone with perpendicular axis through the light source. The light from an ordinary source can be concentrated most efficiently in the general direction required by means of parabolic reflectors or condensing lenses, mounted with their axes horizontal or pointed slightly downward, but the pattern produced on a vertical surface will be circular and if the apparatus be adjusted to give the highest intensity within the field, the intensity will be greatest at the center of the circle and fall off uniformly in all directions from that point.

The object of our invention is to provide cover glasses for ordinary light projecting apparatus which will consist of a background permitting a portion of the beam to pass through undeviated or slightly spread and in addition provide a prismatic construction for redirecting the balance of the beam in accordance with requirements of the distribution to be obtained.

In one construction of this character, this re-direction of a portion of the light is obtained by providing a system of diagonal refracting lattices each of which is of uniform cross section throughout its length. The area occupied by these lattices is adjusted so that the right proportion of light is subtracted from the undeviated beam to provide for the illumination in the outer and lower parts of the beam pattern desired. The inclination of the various diagonal elements with reference to the horizontal is made such that this light will be refracted downward and outward in the proper directions to fill in the required beam pattern and the cross section of the lattices made of the proper curvature to give the necessary spread along the general line in which the light is refracted downward. By carefully selecting the different inclinations for the diagonal elements and carefully determining the proper area to be taken up by the various elements and the curvature of the refracting surfaces to produce the necessary spread of light at the various inclinations, a close approximation of the theoretical pattern required can be obtained. In the case of automobile headlighting, it is not essential that the whole face of the cover glass should be bright at all angles within the field and therefore the diagonal lattices provided will be each of a different inclination and be as numerous as is consistent with the necessary limitations that none of them shall take up more than the required area and that none of them shall be too small to insure a fair degree of accuracy in their curvature. In the case of traffic signals, it is very desirable that the full surface of the cover glass be operative at all angles in the field. In order to take care of this requirement, we select a limited number of inclinations to be used for the diagonal lattices and repeat these lattice elements at regular spacing across the whole face of the cover. In this case, of course, the approximation to the required light pattern given cannot be as good as in the first variation referred to but at any angle in the field, light will be received from widely separated portions of the cover glass and the desired size effect will be produced by the signal. It will usually be found that it is desirable that that portion of the beam which is not deviated downward should be spread symmetrically through a small lateral angle. Where it is desired for maintenance purposes that the outer face of the cover glass be left entirely smooth, we obtain this spread by forming the whole background of the interior surface of the cover glass in shallow vertical parallel flutes.

Figure 2:
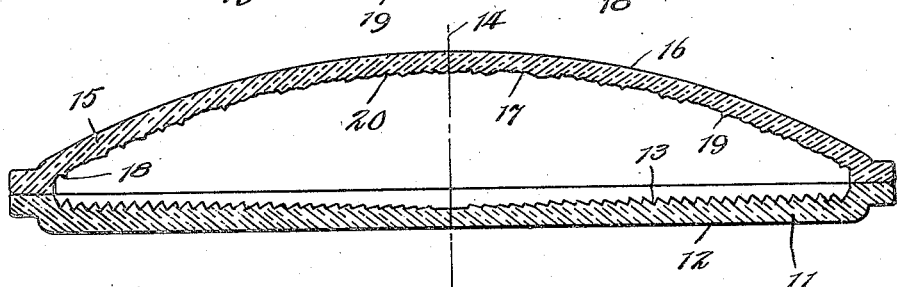

Figure 1 is a diagram of the vertical light pattern required for a traffic signal mounted at center of street. Fig. 2 is a diagrammatic horizontal cross-section of a traffic signal embodying one form of our invention. Fig. 3 is a rear elevation of the traffic signal shown in cross-section in Fig. 2. Fig. 4 is an enlarged transverse cross section of a typical refracting lattice element 18. Fig. 5 is a diagrammatic cross section of a traffic lens embodying a modification of our invention.

Figure 1 is a diagram of the vertical light pattern required for a traffic signal mounted at center of street, 1 represents the far boundary of the rectangle to be lit, 2 the near boundary and 3, 3, the side boundaries. Lines 4, 5, 6, 7, 8 and 9 are lines of equal intensity and are chosen so that their difference in intensity is constant. For instance, if the intensity at 5 is 100 c. p. less than at 4, then the intensity at 6 is 100 c. p. less than the intensity at 5, etc.

Figure 2 is a diagrammatic horizontal cross section of a traffic signal embodying one form of our invention. 10 is the light source shown as a point; 11 is a condensing lens having a smooth inner surface 12 and annular prisms 13 on its outer surface formed so as to condense the light rays in directions parallel to the axis 14—14; 15 is the cover glass, also shown in rear elevation in Fig. 3. The outer surface 16 is smooth. The inner surface 20 of the cover is provided with vertical symmetrical flutes 17, and five groups of diagonal lattices 18 refracting light downward to the right and five groups of diagonal lattices 19 refracting light downward to the left, the lattices and flutes intersecting each other so as to completely cover the surface.

Figure 4 is an enlarged transverse cross section of a typical refracting lattice element 18. As this cross section does not change throughout the length of the lattice, the deviation produced will be substantially in planes perpendicular to the length of the lattice. The course of typical light rays is shown in dotted lines.

Figure 5 is a diagrammatic horizontal cross section of a traffic lens in which a slightly different form of our invention is used. In this form, intersecting groups of refracting lattices 18 and 19 are provided on an inner surface 20 of cover glass 15, but the spaces 21 beween the lattice elements are left smooth. The vertical symmetrical flutes 17 completely cover the outer exposed surface 16. When a smooth exposed surface is not demanded, we prefer this form because a flat cover can be used without objectionable specular reflection from outside light sources and because the deviated rays from the lattices are given a slight lateral spread which makes the light from the various lattices merge into each other more smoothly.

If the traffic signal is to be placed at one corner of the rectangle to be lit, at the left hand corner for instance, a wide spread of light will then be required only on the right, and in Figs. 2, 3 and 6, the lattice elements 18 refracting light to the left may be omitted and the area occupied by the lattice elements 19 refracting to the right may be increased.

In any of the types shown the spaces between the prisms may be corrugated instead of plain.

A condensing lens or other condensing means may be used in connection with the cover glass when used in a traffic or other system.

We claim:—

1. A light transmitting and distributing cover for illuminating devices having a surface divided into a series of areas by a plurality of light refracting markings, said markings being intersected by a second plurality of light refracting markings, each marking of the second set intersecting all markings of the first set.

2. A light transmitting and distributing cover for illuminating devices having a surface divided into a series of areas by a plurality of light refracting markings, said markings being intersected by a second plurality of light refracting markings, each marking of the second set intersecting all markings of the first set, each set of markings having its markings arranged in parallelism.

3. A light transmitting and distributing cover for illuminating devices having a surface divided into a series of areas by a plurality of light refracting markings, said markings being intersected by a second plurality of light refracting markings, each marking of the second set intersecting all markings of the first set, each set of markings having its markings arranged in parallelism, one set of markings being more closely spaced than the second set of markings.

4. A light transmitting and distributing cover for illuminating devices having on one face a plurality of sets of intersecting light diffusing markings arranged to form a multiplicity of equal geometrical figures, said face further having a second plurality of sets of intersecting light diffusing markings also arranged to form a multiplicity of equal geometrical figures of unlike character to the first figures whereby the surface of said face is provided with a multiplicity of unlike figures.

5. A light transmitting and distributing cover for illuminating devices having a surface divided into a series of areas by a plurality of light refracting markings, said markings being intersected by a second plurality of light refracting markings, each marking of the second set intersecting all markings of the first set, and associated with such areas, a series of light spreading corrugations.

6. A light transmitting and distributing cover for illuminating devices comprising a condensing lens and a cover glass for the same one surface of the cover glass being divided into a series of areas by a plurality of light refracting markings, said markings being intersected by a second plurality of light refracting markings, each marking of the second set intersecting all markings of the first set.

7. An apparatus for traffic signals comprising a source of light, and a condensing lens having a flat smooth inner face toward the light and concentric lens surfaces on its outer face, the lens surfaces adapted to concentrate light rays in a substantially horizontal direction and the center of this light source being slightly displaced from focus in an upward direction, in combination with a cover glass completely enclosing the prismatic surface of the lens, the outer surface being provided with substantially vertical symmetrical spreading flutes and the inner surface of the cover glass being arranged in a pattern, any substantial portion of the pattern having a definite proportion of its surface composed of various series of parallel diagonal cylindrical light directing lens surfaces the various series being at different angles adapted to spread and redirect definite portions of the beam downward and outward from the axis of the lens system.

Signed at Newark, in the county of Licking, and State of Ohio, this 21st day of December, 1925.

THOMAS W. ROLPH.
WILLIAM A. DOREY.